July 9, 1929.  J. F. WEBB, SR  1,720,191
MUFFLED BEARING
Original Filed Sept. 26, 1927   3 Sheets-Sheet 1
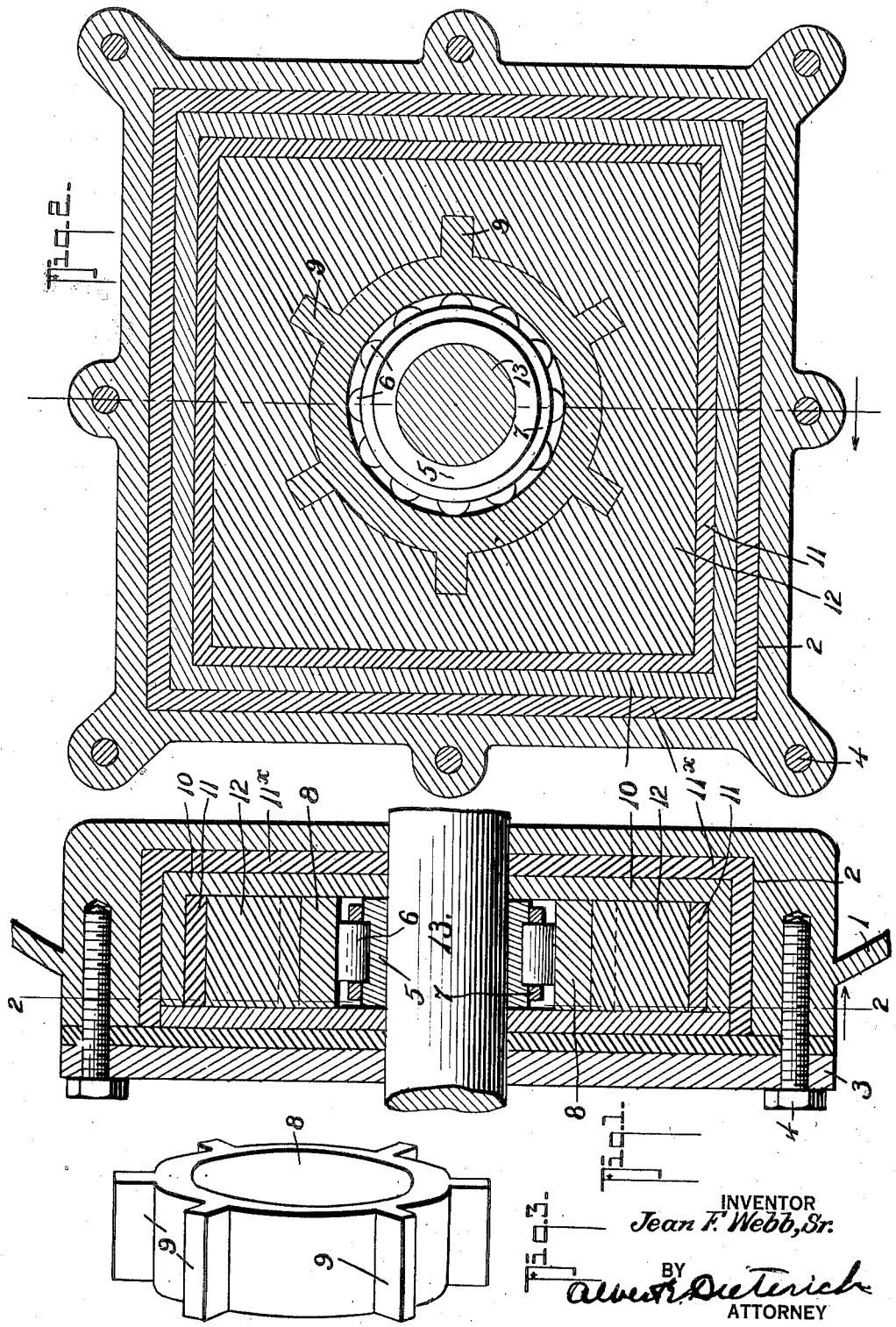
INVENTOR
Jean F. Webb, Sr.
BY
Albert R. Dieterich
ATTORNEY

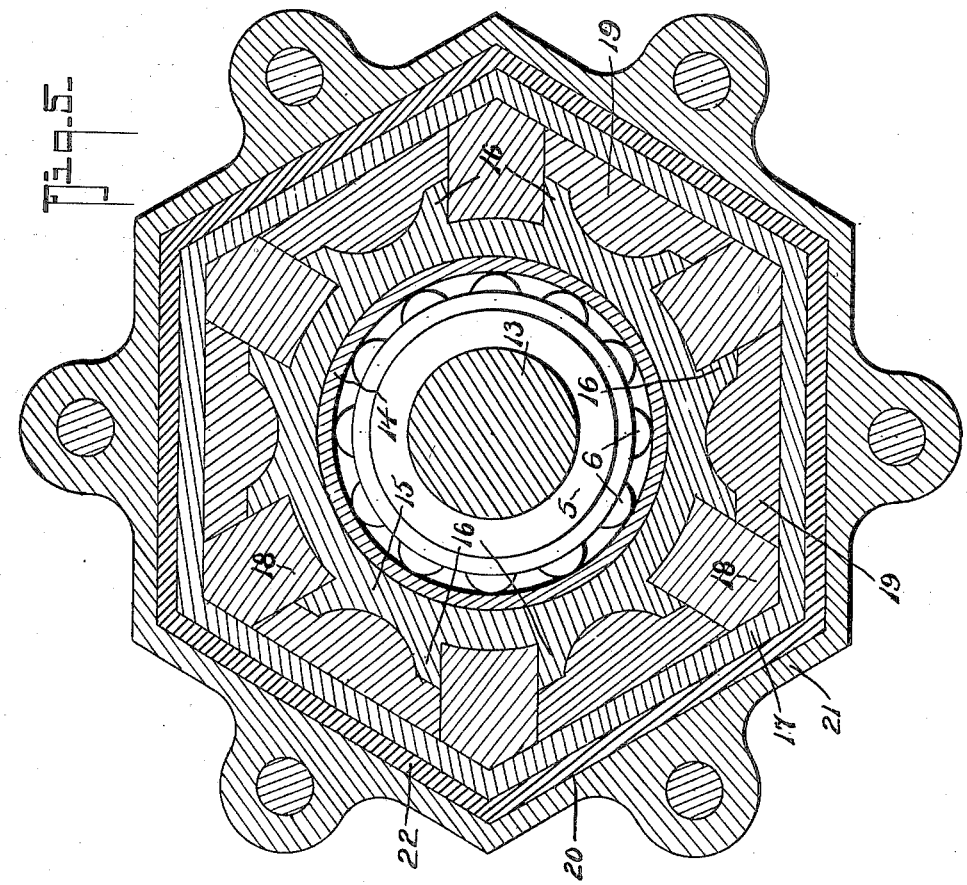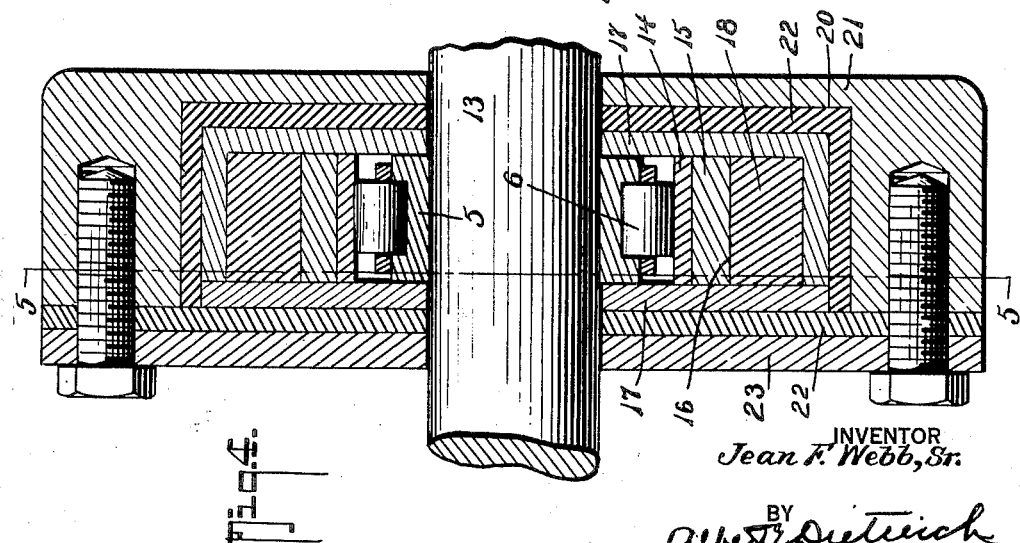

July 9, 1929. J. F. WEBB, SR 1,720,191
MUFFLED BEARING
Original Filed Sept. 26, 1927 3 Sheets-Sheet 3
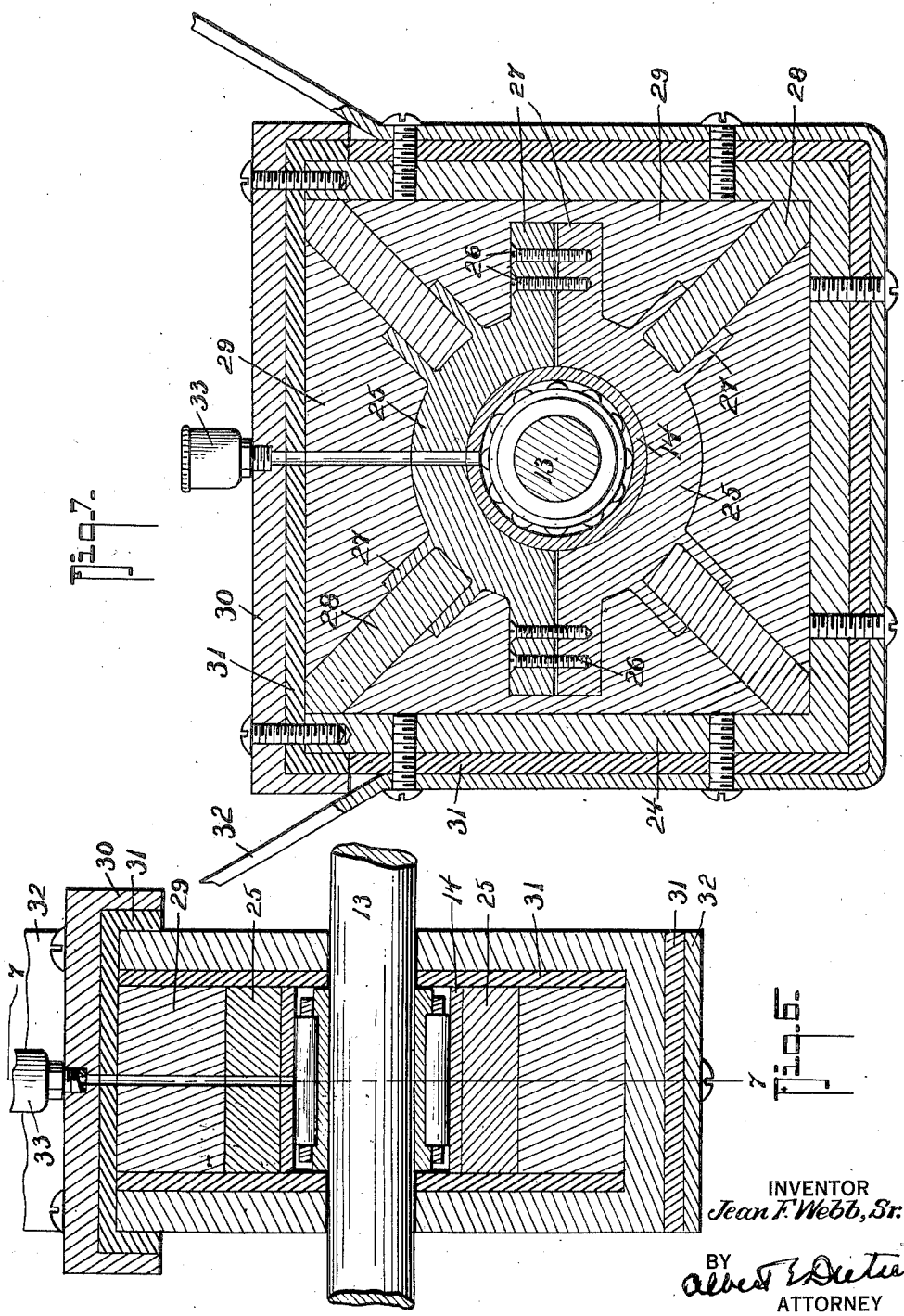
INVENTOR
Jean F. Webb, Sr.
BY
ATTORNEY Patented July 9, 1929.

1,720,191

UNITED STATES PATENT OFFICE.

JEAN F. WEBB, SR., OF NEW YORK, N. Y.

MUFFLED BEARING.

Application filed September 26, 1927, Serial No. 222,047. Renewed September 20, 1928.

My invention relates to shaft bearings and it has been particularly devised for use as a bearing for the crank or propeller shaft of air crafts, though its use is not so limited.

The primary object of the invention is to muffle the loud noises made by the vibrations of a propeller crank shaft when revolving within anti-friction bearings. In airplane use, the anti-friction bearings receive, absorb and transmit to the metal body of the engine shell the noises made by the cranks, and also the continuous vibrations of the propeller shaft, caused by the fluttering action of the revolving blades against the terrific air pressure that opposes their revolution. The present practice is to force the anti-friction bearing outer ring into and rigidly imbed it in a pocket in the outside shell or frame of the engine. Thus the bearing at once becomes an integral part of the shell or frame so that each vibration and sound wave made by the crank bearings is instantly transmitted to the entire metal shell of the engine, and the metal sound resonance is thereby greatly magnified; when the body of the airplane is of metallic construction the passengers within the body are frequently deafened by the loud noises, the body acting as a resonator and amplifier as it were.

The theory of my invention is that, by disconnecting the bearings of a propeller crank shaft from the metal shell of the engine, no waves of sound, caused by the crank shaft, nor the heavy vibrations of the crank shaft, caused by the wind resistance on the blades, can be fully transmitted to or magnified by the metallic resonance of the engine shell; and that the muffling and silencing of the noises which will always be made by the bearings, can be so confined, insulated and smothered by the use of my invention that it will make airplanes far more silent for military use, and far more comfortable in commercial use for the aviators and passengers, who are now deafened by their roaring noise which can be heard for miles.

Further, it is an object of the invention to provide a bearing of the character stated which can be easily and cheaply manufactured and one which can be used wherever shaft bearings are employed either in aerial, land vehicles, aquatic vehicles or in machinery of various kinds.

Other objects will in part be obvious and in part be hereinafter referred to.

To the attainment of the aforesaid objects and ends, my invention consists in the novel details of construction and in the combination, connection and arrangement of parts hereinafter more fully described and then pointed out in the claims.

In the drawings:

Figure 1 is a horizontal section of a portion of an engine shell of an airplane with a preferred embodiment of my invention applied.

Figure 2 is a cross section on the line 2—2 of Figure 1.

Figure 3 is a detail perspective view of the outer bearing ring per se.

Figure 4 is a view similar to Figure 1 showing another embodiment of my invention.

Figure 5 is a section on the line 5—5 of Figure 4.

Figure 6 is a view similar to Figure 1 showing a third embodiment of my invention.

Figure 7 is a section on the line 7—7 of Figure 6.

In the drawings the parts which have the same construction and form bear the same reference numerals in all the figures.

Referring now particularly to the first embodiment of my invention, 1 designates the engine shell having the bearing receiving pocket 2 which is adapted to be closed by the cover 3 that is secured by screws 4, or in any other suitable manner.

The inner ring 5 of the bearing is adapted to fit on and turn with the propeller or engine crank shaft 13, while the other ring 8 is adapted to be rigidly held in a manner presently explained. Between the inner ring 5 and the other ring 8 are disposed the usual anti-friction bearings 6 and bearing cage 7. Any desired type of anti-friction bearings, roller or ball for example, may be employed.

In carrying out my invention, the outer ring 8 is provided with a suitable number of lugs 9 which, together with the outer bearing ring, are tightly embedded in a block 12 of wood, fibre, or other material of suitable strength that is a poor conductor of sound. This block or bed 12 is mounted within a metallic bearing box 10, which may be inserted directly in the pocket 2 of the engine shell to effect a tight fit, but preferably there is a sound deadening lining 11$^x$ interposed between box 10 and pocket 2. A sound insulating lining 11 is preferably interposed between the block 12 and the box 10 preferably of a material having a different coefficient of sound transmission from that of either the block 12 or the shell 10. The sound insulating lining 11 may be composed of fibre, vulcanized rubber, hard packed asbestos or any other suitable material. Instead of placing the block 12 in the box 10, it may be placed directly in the pocket 2 if so desired, the sound insulating lining 11 being interposed as before.

In the second embodiment of my invention, illustrated in Figure 4, the outer ring 14 of the bearing proper is tightly fitted within a bronze or other suitable metal casting socketed to receive the ring and hold it against movement with retaining friction. The holder 15 for the ring 14 is provided with hollow lugs 16 to receive the legs 18 that mount the holder 15 and bearing proper in rigid position within the metallic box 17, there being a suitable filler 19 placed within the box around the holder 15 to deaden sound as well as to reinforce or support the holder. The material of which the filler 19 is made may be of vulcanized rubber, fibre, compressed asbestos, etc., etc., so long as it is a material that is a poor conductor of sound waves.

The box 17 in this embodiment of my invention is placed within the fixed support 21 which may be the engine shell having the pocket 20 to receive the box 17, the latter being sound insulated from the former by a suitable sound insulating lining 22, the parts being held within the support 21 by a suitable cover 23.

In the embodiment of my invention illustrated in Figure 7, it will be observed that the outer bearing ring 14 is held by clamping it between the two halves of the outer split bearing ring container 25, the split bearing ring container 25 being preferably formed of stout metal and the two parts thereof are secured together by suitable means such as screws 26 for example.

The two halves 25 of the bearing ring container are provided with lugs 27 to receive the legs 28, a suitable filler 29 surrounding the members 25 within the metallic box 24. The box 24 is provided with a suitable cover 30, the cover being sound deadened by means of a lining 31 of sound deadening material. The box 24 is sustained in a suitable fixed support such as a bracket or hanger 32, the latter being sound deadened or insulated from the box 24 by a continuation of the sound deadening lining 31.

In this latter embodiment of my invention, if it is desired to oil the bearings a suitable oiling device 33 may be provided. Instead of using anti-friction bearings, a plain bearing may be employed.

In the practical carrying out of my invention, I prefer to use different sound deadening materials for the legs, the filler and the sound deadening lining so that their various coefficients of sound wave transmission will not be of the same degree in order that a sound wave travelling from the shaft to the outer fixed support will be interrupted, distorted and muffled to such an extent that in large measure it will be killed before it reaches the outer fixed support (engine shell), thereby muffling the sounds to such an extent as will substantially lessen the noise, if not entirely eliminate it.

From the foregoing description, taken in connection with the accompanying drawings, it is thought the complete construction, operation and advantages of my invention will be clear to those skilled in the art to which it relates.

What I claim is:

1. In a muffled bearing, an inner rotatable ring and an outer stationary ring and anti-friction elements between said rings; a box; means including legs of a material constituting a poor conductor of sound for sustaining said outer ring in a fixed position in said box, and a filler in said box around said outer ring, said filler being composed of a material constituting a poor conductor of sound waves.

2. In a muffled bearing, an inner rotatable ring and an outer stationary ring and anti-friction elements between said rings; a box; means including legs of a material constituting a poor conductor of sound for sustaining said outer ring in a fixed position in said box, and a filler in said box around said outer ring, said filler being composed of a material constituting a poor conductor of sound waves, said filler and said legs being respectively of materials having different coefficients of sound wave conduction.

3. A muffled bearing comprising an inner rotatable ring adapted to fit and rotate with a shaft, an outer stationary ring, anti-friction elements beween said rings; a body in which said bearing is mounted, a sound deadening lining for said body, and a structure which includes sound deadening material, to receive and hold said outer ring and mount it within said body.

4. A muffled bearing comprising an inner rotatable ring adapted to fit and rotate with a shaft, an outer stationary ring, anti-friction elements between said rings; a body in which said bearing is mounted, a sound deadening lining for said body; a metallic shell within said body surrounded by said lining; a holder in which said outer ring is rigidly held; and means mounting said holder in said shell, said means including sound deadening elements.

5. A muffled bearing comprising an inner rotatable ring adapted to fit and rotate with a shaft, an outer stationary ring, anti-friction elements between said rings; a body in which said bearing is mounted, a sound deadening lining for said body; a metallic shell within said body surrounded by said lining; a holder in which said outer ring is rigidly held; and means mounting said holder in said shell, said means including sound deadening elements which comprise legs and a filler.

6. A muffled bearing comprising an inner rotatable ring adapted to fit and rotate with a shaft, an outer stationary ring, anti-friction elements between said rings; a body in which said bearing is mounted, a sound deadening lining for said body; a metallic shell within said body surrounded by said lining; a holder in which said outer ring is rigidly held; and means mounting said holder in said shell, said means including sound deadening elements which comprise legs and a filler, the materials of which said legs and filler are composed having different coefficients of sound wave transmission.

7. A muffled bearing comprising an inner rotatable ring adapted to fit and rotate with a shaft, an outer stationary ring, anti-friction elements between said rings; a body in which said bearing is mounted, a sound deadening lining for said body; a metallic shell within said body surrounded by said lining; a holder in which said outer ring is rigidly held; and means mounting said holder in said shell, said means including sound deadening elements, said holder comprising a split ring with socketed lugs and said mounting means comprising sound deadening legs held in said socketed lugs.

8. A muffled bearing comprising an inner rotatable ring adapted to fit and rotate with a shaft, an outer stationary ring, anti-friction elements between said rings; a body in which said bearing is mounted, a sound deadening lining for said body; a metallic shell within said body surrounded by said lining; a holder in which said outer ring is rigidly held; and means mounting said holder in said shell, said means including sound deadening elements, said holder comprising a split ring with socketed lugs and said mounting means comprising sound deadening legs held in said socketed lugs, and a filler of sound deadening material.

JEAN F. WEBB, Sr.